US008558152B2

(12) United States Patent
Roncone

(10) Patent No.: US 8,558,152 B2
(45) Date of Patent: Oct. 15, 2013

(54) LENS CONCENTRATOR SYSTEM FOR SEMI-ACTIVE LASER TARGET DESIGNATION

(75) Inventor: Ronald L. Roncone, Vail, AZ (US)

(73) Assignee: Raytheon Company, Waltham, MA (US)

( * ) Notice: Subject to any disclaimer, the term of this patent is extended or adjusted under 35 U.S.C. 154(b) by 449 days.

(21) Appl. No.: 12/841,817

(22) Filed: Jul. 22, 2010

(65) Prior Publication Data

US 2012/0193538 A1     Aug. 2, 2012

(51) Int. Cl.
*F41G 7/22*     (2006.01)
*F42B 15/01*     (2006.01)
*F41G 7/00*     (2006.01)
*F42B 15/00*     (2006.01)

(52) U.S. Cl.
USPC .......... 244/3.16; 244/3.1; 244/3.15; 250/200; 250/206; 250/206.1

(58) Field of Classification Search
USPC ............... 244/3.1–3.19; 264/1.1, 1.7; 257/79, 257/100; 359/362, 618, 619, 626; 427/162, 427/240; 428/221, 332, 334, 335, 336, 428/411.1, 421, 422, 426, 428, 429; 430/4, 430/5; 525/50, 55, 191, 197; 102/200, 206, 102/211, 213; 250/200, 206, 206.1
See application file for complete search history.

(56) References Cited

U.S. PATENT DOCUMENTS

| | | | | |
|---|---|---|---|---|
| 3,741,111 A | * | 6/1973 | Brenner | 244/3.16 |
| 3,912,198 A | * | 10/1975 | Dell et al. | 244/3.16 |
| 3,912,859 A | * | 10/1975 | Christopherson | 244/3.16 |
| 3,944,167 A | * | 3/1976 | Figler et al. | 244/3.16 |
| 4,006,356 A | * | 2/1977 | Johnson et al. | 244/3.16 |
| 4,013,245 A | * | 3/1977 | Vanbuskirk | 244/3.16 |
| 4,038,547 A | * | 7/1977 | Hoesterey | 244/3.11 |
| 4,085,910 A | * | 4/1978 | Baker et al. | 244/3.16 |
| 4,087,061 A | * | 5/1978 | Burt | 244/3.16 |
| 4,111,383 A | * | 9/1978 | Allen et al. | 244/3.13 |
| 4,111,384 A | * | 9/1978 | Cooper | 244/3.13 |
| 4,111,385 A | * | 9/1978 | Allen | 244/3.13 |
| 4,131,254 A | * | 12/1978 | Underwood | 244/3.16 |
| 4,155,521 A | * | 5/1979 | Evans et al. | 244/3.16 |
| 4,192,475 A | * | 3/1980 | Heinrich | 244/3.16 |
| 4,231,533 A | * | 11/1980 | Durig | 244/3.16 |
| 4,234,145 A | * | 11/1980 | Leiboff | 244/3.16 |
| 5,139,879 A | * | 8/1992 | Aharoni et al. | 428/422 |
| 5,198,267 A | * | 3/1993 | Aharoni et al. | 427/162 |
| 5,225,244 A | * | 7/1993 | Aharoni et al. | 427/240 |

(Continued)

OTHER PUBLICATIONS

Dupont "Teflon AF Amorphous Fluoropolymers," 2010; retrieved on May 24, 2010 from the Internet at http://www2.dupont.com/Teflon_Industrial/en_US/products/product_by_name/teflon_af/index.html.

*Primary Examiner* — Bernarr Gregory
(74) *Attorney, Agent, or Firm* — Lando & Anastasi, LLP

(57) ABSTRACT

A semi-active laser (SAL) sensing system is thus provided that uses a lens concentrator system to pass received reflected laser light from an aperture to a detector. The lens concentrator system facilitates the use of SAL systems with different laser designator wavelengths to improve the performance of the SAL system. In one embodiment, the lens concentrator system is formed from polymer having substantial optical clarity for radiation having wavelengths between approximately 1.5 and approximately 1.65 μm. For example, the lens concentrator system may be formed from amorphous fluoropolymer. The lens concentrator system formed from amorphous fluoropolymer facilitates the use SAL designators using different wavelengths than those in past SAL sensing systems.

18 Claims, 3 Drawing Sheets

(56) References Cited

U.S. PATENT DOCUMENTS

| | | | |
|---|---|---|---|
| 5,456,179 A * | 10/1995 | Lamelot | 244/3.16 |
| 5,458,298 A * | 10/1995 | Lamelot | 244/3.16 |
| 5,526,181 A * | 6/1996 | Kunick et al. | 244/3.16 |
| 5,560,567 A * | 10/1996 | Hallmark | 244/3.14 |
| 5,629,516 A * | 5/1997 | Olbertz | 244/3.16 |
| 5,916,971 A * | 6/1999 | Koike et al. | 525/197 |
| 6,183,872 B1 * | 2/2001 | Tanaka et al. | 428/429 |
| 6,649,092 B2 * | 11/2003 | Vicker et al. | 264/1.7 |
| 6,721,101 B2 * | 4/2004 | Daniell | 359/626 |
| 6,921,929 B2 * | 7/2005 | LeBoeuf et al. | 257/100 |
| 7,297,398 B2 * | 11/2007 | Feiring et al. | 428/336 |
| 7,438,995 B2 * | 10/2008 | French et al. | 430/5 |
| 7,530,528 B2 | 5/2009 | Jenkins et al. | |
| 7,540,449 B2 | 6/2009 | Jenkins et al. | |
| 7,615,283 B2 * | 11/2009 | Radcliffe et al. | 428/421 |
| 7,696,291 B2 * | 4/2010 | Yamamoto et al. | 359/362 |
| 8,207,481 B2 * | 6/2012 | Taylor et al. | 244/3.16 |

* cited by examiner

LENS CONCENTRATOR SYSTEM FOR SEMI-ACTIVE LASER TARGET DESIGNATION

TECHNICAL FIELD

The present invention relates to guidance systems, including semi-active laser (SAL) designation of targets.

BACKGROUND

A variety of guidance systems are used in military applications. As one example, semi-active laser (SAL) designation is used in military systems to designate targets and guide a missile or other weapon to the target. In a typical SAL system, the operator of a SAL designator fires a narrow pulsed laser beam at a target. The SAL designator may be man-portable or carried by a designator aircraft such as an unmanned aerial vehicle (UAV).

The laser beam fired by the SAL designator reflects off the target to provide a reflected spot that can be detected by a SAL sensing system. When the designated target is within range, the SAL sensing system starts processing the detected returns to detect the spot, acquire the designated target and to verify that the SAL designator was the source. The SAL sensing system includes processing equipment for generating guidance commands from the pulse-stream to guide the weapon to impact.

The SAL system thus provides the ability to precisely guide weapons to a designated target. Furthermore, the SAL system provides a "man-in-the-loop" capability that is preferred in many battlefield situations.

One issue in SAL systems is the wavelength (and thus frequency) of the laser beam used to designate targets. In current implementations, SAL designators have been limited to wavelengths that are not desirable for all applications. For example, because of limitations in current SAL sensing systems, current SAL designators have been limited to wavelengths for which inexpensive commercial detectors are readily available. The availability of such detectors makes it easier for third parties to detect the use SAL designators during combat. Unwanted detection of SAL use by third parties can lead to a variety of negative outcomes.

Thus, there remains a continuing need for SAL systems in general, and SAL sensing systems in particular that can be adapted to use different radiation wavelengths. Other desirable features and characteristics of the present invention will become apparent from the subsequent Detailed Description and the appended Claims, taken in conjunction with the accompanying Drawings and this Background.

BRIEF SUMMARY

A semi-active laser (SAL) sensing system is provided that uses a lens concentrator system to pass received reflected laser light from an aperture to a detector. The lens concentrator system facilitates the use of SAL systems with different laser designator wavelengths to improve the performance of the SAL system.

In one embodiment, the lens concentrator system is formed from polymer having substantial optical clarity for electromagnetic radiation at wavelengths between 1.5 and 2.0 µm. In one such implementation, the lens concentrator system is formed from an amorphous fluoropolymer. The lens concentrator system formed from amorphous fluoropolymer facilitates the use SAL designators using different wavelengths than those in past SAL sensing systems. For example, the amorphous fluoropolymer lens concentrator system may facilitate the use lasers in SAL designators that are not detectable with detectors that are readily available to the general public, or in some countries due to export controls. Additionally, the amorphous fluoropolymer lens concentrator system may facilitate the use SAL designators that are less likely to cause eye injury.

Thus, when properly configured, the amorphous fluoropolymer lens concentrator system provides the optical path needed between the SAL sensing system aperture and the detector, and facilitates the use laser designator wavelengths that improve the performance of the SAL system.

BRIEF DESCRIPTION OF THE DRAWINGS

At least one example of the present invention will hereinafter be described in conjunction with the following figures, wherein like numerals denote like elements, and.

DETAILED DESCRIPTION

A semi-active laser (SAL) sensing system is provided that uses a lens concentrator system to pass received reflected laser light from an aperture to a detector. The lens concentrator system facilitates the use of SAL systems with different laser designator wavelengths to improve the performance of the SAL system.

In one embodiment, the lens concentrator system is formed from an amorphous fluoropolymer having optical clarity for electromagnetic radiation in a first wavelength range. The amorphous fluoropolymer lens concentrator system facilitates the use SAL designators using different wavelengths than those in past SAL sensing systems. For example, the use of amorphous fluoropolymer in a lens concentrator system facilitates the use of lasers in SAL designators that are not detectable with detectors that are readily available to the general public, or in some countries due to export controls.

When properly configured, the amorphous fluoropolymer lens concentrator system provides the optical path needed between an aperture in the SAL sensing system and a detector. The lens concentrator system ensures that the received light is properly focused on the detector, and thus facilitates the detection of reflected laser light. Furthermore, in the current embodiments, the lens concentrator system facilitates the use laser designator wavelengths that improve the performance of the SAL system.

In general, SAL systems are used in military applications where a "man-in-the-loop" capability is preferred to active designation systems that require the weapon to designate the target. Typically, there are two main parts to a SAL system, i.e., a designator used to designate targets and a sensing system used to guide a weapon to the designated target. During use, the operator aims the designator to visualize the target, and typically pulls a trigger to enable the designator and fire a pulse-stream to place a laser "spot" on the target. The SAL sensing system, typically implemented on ordinance weapons such as missiles, receives the reflected returns from the target, and uses the reflected returns to guide the weapon to the target.

Figure 1:
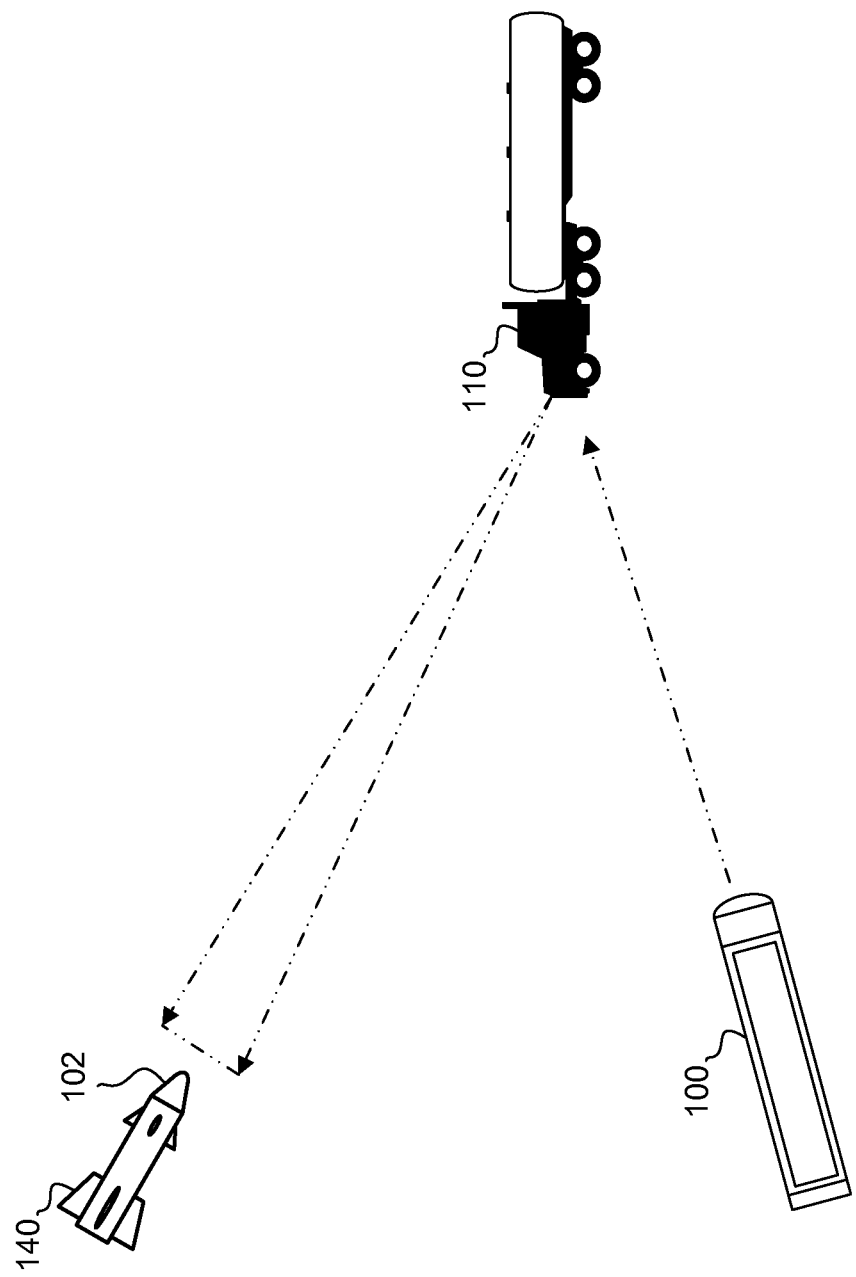
FIG. 1 is schematic view of a semi-active laser (SAL) system used in weapon systems.

Turning now to FIG. 1, an exemplary SAL sensing system 102 on a missile 140 tracks a target 110 via a spot of laser light directed at it by laser designator 100. In various SAL systems, the designator 100 may be man-portable or carried by a designator aircraft such as an manned aircraft or an unmanned aerial vehicle (UAV). The operator typically coordinates via radio with a command center and fires the SAL designator 100 to transmit a narrow pulsed laser beam to place and hold a spot on the target. When the missile 140 is in range, the SAL sensing system 102 receives the reflected returns from the target, and processes the returns to detect the spot, acquire the designated target and verify that the SAL designator was the source. The SAL sensing system 102 will typically include processing for initiating the generation of guidance commands from the reflected returns to guide the weapon to impact.

Figure 3:
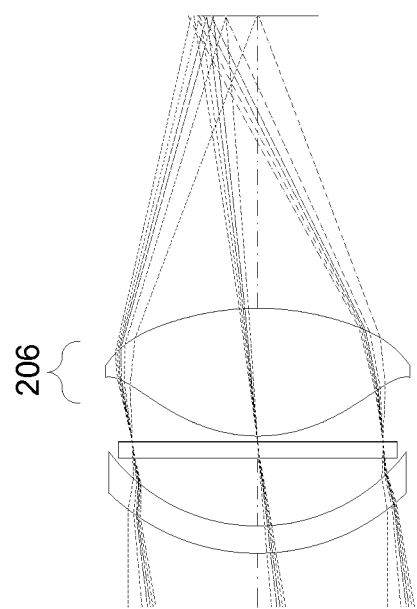
FIG. 3 is a side view of a lens concentrator system in accordance with an embodiment of the invention.
Figure 2:
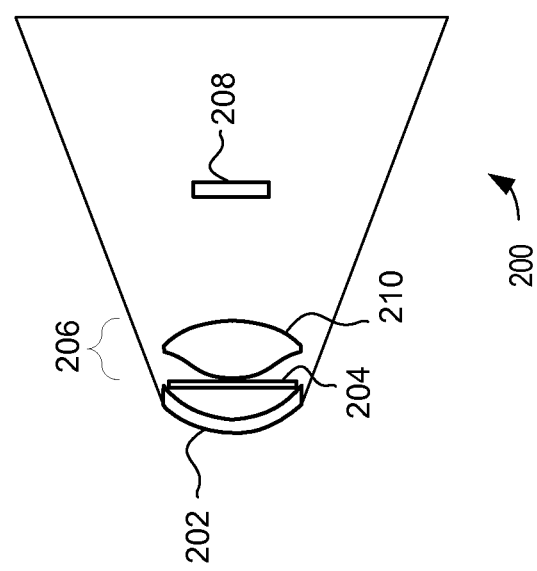
FIG. 2 is a side view of a SAL sensing system in accordance with an embodiment of the invention.
Figure 5:
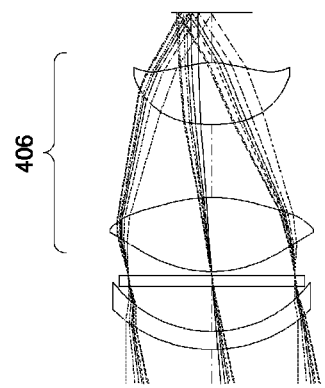
FIG. 5 is a side view of a lens concentrator system in accordance with another embodiment of the invention

Turning now to FIGS. 2 and 3, an exemplary sensing system 200 in accordance with an embodiment of the invention is illustrated schematically. The sensing system 200 includes an aperture lens 202, a diffuser 204, lens concentrator system 206, and a detector 208. The aperture lens 202 is configured to receive reflected electromagnetic radiation from the target, and pass the received radiation to the diffuser 204, which diffuses the received radiation and passes it to the lens concentrator system 206. The lens concentrator system 206 focuses the received radiation to the detector 208. FIG. 3 illustrates the lens concentrator system 206 in more detail, with the light paths from the aperture lens 202 to the detector 208 illustrated to show how light is focused on the detector 208. The detector 208 determines the spatial distribution of the received radiation, and that spatial distribution is used to guide the missile toward the source of the reflected radiation.

The aperture lens 202 provides the aerodynamic face of the sensing system 200. Thus, in a typical embodiment, the aperture lens 202 is formed from an appropriate material that is optically clear at the wavelengths of interest. As will be described below, in one embodiment the aperture lens 202 is formed from the same type of amorphous fluoropolymer used to form the lens concentrator system 206.

The diffuser 204 serves to spread out received light into a known cone angle. This helps insure the light is transmitted to the detector 208 in the correct pattern. For example, the diffuser 204 may comprise a lens array, a diffractive optical element, or other optical spreading elements. As such, the diffuser 204 compensates for variations caused by atmospheric conditions. Several examples of a diffuser structure that may be used are found in U.S. Pat. No. 7,530,528, assigned to Raytheon Company. For example, the diffuser 204 may be formed with a plurality of lenslets. As another specific example, the diffuser 204 may comprise a light shaping diffuser from Physical Optics Corporation, which may produce Gaussian spread profiles and high throughput.

The detector 208 detects the presence of the light which has passed through the aperture lens 202, diffuser 204, and lens concentrator system 206, and generates a signal which is communicated to a guidance system (not shown in FIG). In general, the guidance system receives the signal communicated from the detector 208 and provides signals to the flight control system to control the path of the projectile. As such, the guidance system may include moving components, such as a gimbaled seeker, or may be fixed-post. The guidance system may further comprise any additional elements or components to facilitate implementation, such as a housing, connectors, retaining rings, alignment rings, barrels, pins, adhesives, gaskets, compliant material, spacers, and/or the like.

The detector 208 may be configured in any appropriate manner to detect the relevant energy and generate corresponding signals. In particular, the detector 208 may be configured to produce an output signal in response to incident light. The output signal may vary depending on the position of the incident radiation on the detector 208, and may vary in response to a change in the properties of incident radiation, such as frequency, energy density, wavelength, and total energy.

Signals generated by the detector 208 may be analyzed to determine the direction from which light is received, such as to guide the projectile to a target. For example, the detector 208 may generate signals corresponding to the amount of energy striking different parts of the detector 208. In one embodiment, referring to FIG. 3, the detector 208 is divided into two or more energy-sensitive areas around a center point of the detector 208. For example, the present detector 208 may be divided into four segments A-D by two perpendicular axes intersecting at the approximate center point of the detector 208. Alternatively, the number and shape of the various segments A-D may be selected according to any criteria and configuration. In one embodiment, the detector 208 comprises a quad-cell detector. Alternatively, the detector 208 may comprise a grouping of separate detection devices, such as four separate detection devices. The detector 208 may comprise any appropriate energy detection system, such as a quad-cell, a digital imaging system comprising an active pixel sensor, single-pixel light detectors, photocells, charge-coupled devices, and the like.

When so configured, the detector 208 may generate signals according to the amount of energy received in the different segments A-D. Thus, if incoming light strikes the "southwest" quadrant of the four-area detector 208, the detector may generate a signal corresponding to the southwest quadrant of the detector. In addition, the signal may correspond to the brightness of the energy incident upon the detector. Thus, if both the "southwest" and the "southeast" quadrants receive light in a relevant wavelength range, and the relevant light on the southwest quadrant is twice as intense as the light on the southeast quadrant, the detector 208 may generate a first signal corresponding to the light on the southwest quadrant that is twice the magnitude of a second signal corresponding to the southeast quadrant. However, it should be noted that a quad-detector is just one type of detector that can be used in the sensing system 200.

In one embodiment, the detector 208 is configured to detect radiation in multiple distinct wavelengths. For example, the detector 208 may be configured to detect radiation in wavelengths now commonly used in SAL systems and in another wavelength. In one particular embodiment, the detector 208 comprises a dual band detector configured to detect radiation at two distinct wavelengths. In this embodiment, the detector 208 may be configured to detect wavelengths between 1.0 and 1.1 µm, allowing the device to detect targets that are designated with current devices. Likewise, the detector may be also configured to detect wavelengths between 1.5 and 1.65 µm, or 1.5 and 2.0 µm, allowing the sensing system 200 to be used to detect radiation with wavelengths that are more eye safe and less likely to be detectable with readily available devices.

As stated above, in a typical implementation a guidance system receives the signals from the detector 208 and guides the missile or other projectile to the source of received light. As such, the guidance system may comprise any controller for receiving information from the detector 208 and guiding the projectile according to the detector information. As the detector 208 communicates information to the guidance system, the system analyzes the information and, if necessary, transmits guidance information to the control surfaces, propulsion system, or other guidance elements.

As was described above, the lens concentrator system 206 serves to direct light from the diffuser 204 to the detector 208. Specifically, the lens concentrator system 206 redirects incident light received from the diffuser 204 such that the energy converges on a selected portion of the detector 208. As one example, the lens concentrator system 206 may be configured to redirect the energy from the center of each subregion of the diffuser 204 to form a small spot on the detector 208.

In the illustrated embodiment, the lens concentrator system 206 includes a single lens 210. In general, using a single lens 210 reduces cost and provides higher energy transmission to the detector 208. A single lens 210 may typically include a curved image plane for the detector 208 to more effectively map the subregions of the diffuser 204 onto the detector 208, which may decreases aberrations and provide for enhanced scintillation control. Scintillation control may be adjusted by modifying the ratio between the spot size produced by the combined diffuser 204 and lens concentrator system 206 and the spot size produced by the lens concentrator system 206 alone.

In the illustrated embodiment, the diffuser 204 and the lens concentrator system 206 are implemented as separate elements. However, this is just one example, and they may instead be integrated into a single unit, for example to reduce the number of parts and/or the package size of the sensing system 200. For example, the diffuser 204 may be integrated into a surface of the single lens 210. In such an embodiment, the lens 210 may require an adjusted thickness to provide adequate distance over which to diffuse transmitted energy.

In accordance with the embodiments of the invention, the lens concentrator system 206 illustrated in FIGS. 2 and 3 is formed from polymer having substantial optical clarity for electromagnetic radiation in a wavelength range between 1.5 and 2.0 µm. In a more specific implementation, the lens concentrator system 206 is formed from a fluorinated polymer having substantial optical clarity for electromagnetic radiation at wavelengths between 1.5 and 1.65 µm. In one implementation, the lens concentrator system 206 is formed from an amorphous fluoropolymer. The use of amorphous fluoropolymer to form the concentrator lens system facilitates the use SAL designators using different wavelengths compared to those in past SAL sensing systems.

For example, when used to form a lens concentrator system that has optical clarity for wavelengths between 1.5 and 1.65 µm, the use amorphous fluoropolymer facilitates the use of laser designators that are not detectable with detectors that are readily available to the general public. Specifically, while detectors for radiation at 1.064 µm are readily available to the general public, detectors for radiation between 1.5 and 1.65 µm are typically much more difficult to obtain in some countries due to export controls. Thus, it is substantially more difficult for third parties to obtain detectors that can be used to warn of detect and warn of laser designation by laser detectors that use wavelengths between 1.5 and 1.65 µm.

Another potential advantage in using such a lens concentrator system is increased eye safety. Specifically, laser designators that output in the 1.5 and 1.65 µm range are much less likely to cause eye damage when compared to similarly powered lasers at or near 1.064 µm. Thus, the use of a lens concentrator system formed of such material may facilitate the creation of a relatively "eye safe" system when compared to past devices.

In the embodiments illustrated in FIGS. 2 and 3, the lens concentrator system 206 comprises a single lens 210. However, as was noted above, this is just one example, and the lens concentrator system 206 may instead comprise any appropriate system for redirecting the energy, such as one or more lenses, mirrors, splitters, prisms, and/or the like. For example, the lens concentrator system 206 may comprise two or more sharp focus lenses to converge energy towards the center of the detector.

Figure 4:
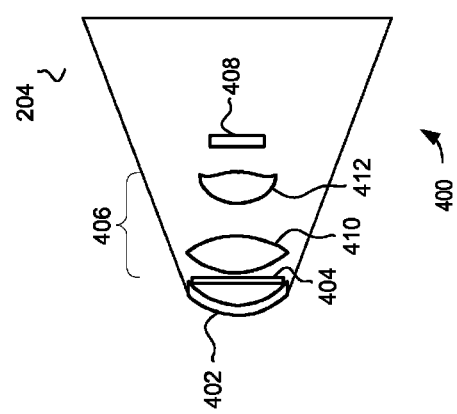
FIG. 4 is a side view of a SAL sensing system in accordance with an another embodiment of the invention.

Turning now to FIG. 4, a second exemplary sensing system 400 in accordance with the embodiments of the invention is illustrated schematically. The sensing system 400 includes an aperture lens 402, a diffuser 404, lens concentrator system 406, and a detector 408. Again, the aperture lens 402 is configured to receive reflected electromagnetic radiation from the target, and pass the received radiation to the diffuser 404, which diffuses the received radiation and passes it to the lens concentrator system 406. The lens concentrator system 406 focuses the received radiation to the detector 408. The detector determines the spatial distribution of the received radiation, and that spatial distribution is used to guide the missile toward the source of the reflected radiation.

In the illustrated embodiment of FIG. 4, the lens concentrator system 406 comprises two lenses, a first lens 410 and a second lens 412. These two lenses are designed to function together to guide incident radiation from the diffuser 404 to the detector 408. Like the embodiments described with reference to FIGS. 2 and 3, the lens concentrator system 406 illustrated in FIGS. 2 and 3 is preferably formed from polymer having substantial optical clarity for radiation having wavelengths between 1.5 and 1.65 µm. Again, the lens concentrator system 406 may be formed from an amorphous fluoropolymer. The use of amorphous fluoropolymer to form the concentrator lens system facilitates the use SAL designators using different wavelengths than those in past SAL sensing systems. For example, when used to form a lens concentrator system that has optical clarity for radiation with wavelengths between 1.5 and 1.65 µm, the use amorphous fluoropolymer facilitates the use of laser designators that are not detectable with detectors that are readily available to the general public or in some countries due to export controls, and/or that offer increased eye safety.

In some embodiments it may be desirable to form additional elements of the sensing system from amorphous fluoropolymer. For example, the aperture lens and diffuser may be formed from amorphous fluoropolymer in some embodiments.

Amorphous fluoropolymers may provide optical clarity in the wavelengths at issue because they lack some carbon-hydrogen bonds found in conventional polymers. Specifically, in conventional polymers, optical losses in the 1.5-2.0 µm range are primarily caused by the 2nd and 3rd harmonics of the bending and stretching modes of the carbon-hydrogen bond. Since most conventional polymers or plastics contain these carbon-hydrogen bonds, they are largely opaque in this wavelength range. However, if the hydrogen atoms are replaced by fluorine atoms (and/or other halogens), the heavier fluorine atom causes a shift in the fundamental vibrational modes and their harmonics to higher wavelengths and the 1.5 to 2.0 µm wavelength range becomes free of significant absorption modes. Thus, if the polymer is fluorinated, as in the case of amorphous fluoropolymers, the resulting optical elements made from those polymers can have optical clarity for radiation with wavelengths between 1.5 and 2.0 µm.

A variety of different implementations of amorphous fluoropolymer may be used in the various embodiments. For example, in some implementations a formulation of amorphous fluoropolymer available from DuPont Inc, sold under the trade name Teflon AF may be used. Of course this is just one example, and other polymer formulations having appropriate optical clarity may also be used.

For example, another amorphous fluoropolymer that may be used in some implementations is available from Asahi Chemical under the trade name Cytop.

A semi-active laser (SAL) sensing system is thus provided that uses a lens concentrator system to pass received reflected laser light from an aperture to a detector. The lens concentrator system facilitates the use of SAL systems with different laser designator wavelengths to improve the performance of the SAL system. In one embodiment, the lens concentrator system is formed from polymer having substantial optical clarity for radiation having wavelengths between 1.5 and 1.65 µm. For example, the lens concentrator system may be formed from amorphous fluoropolymer. The lens concentrator system formed from amorphous fluoropolymer facilitates the use SAL designators using different wavelengths than those in past SAL sensing systems. For example, the amorphous fluoropolymer lens concentrator system may facilitate the use lasers in SAL designators that are not detectable with detectors that are readily available to the general public or in some countries due to export controls. Additionally, the amorphous fluoropolymer lens concentrator system may facilitate the use SAL designators that are less likely to cause eye injury.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A sensing system for a semi-active laser system, the sensing system comprising:
   an aperture lens configured to receive electromagnetic radiation; and
   a lens concentrator system configured to receive the electromagnetic radiation from the aperture lens and guide the electromagnetic radiation to a detector, wherein the lens concentrator system comprises an amorphous fluoropolymer having optical clarity for radiation in a first wavelength range, the first wavelength range being between approximately 1.5 and approximately 1.65 µm and corresponding to a laser designator of the semi-active laser system.

2. The sensing system of claim 1 wherein the sensing system comprises a semi-active laser sensing system.

3. The sensing system of claim 1 further comprising a diffuser configured between the aperture lens and the lens concentrator system.

4. The sensing system of claim 3 wherein the diffuser comprises amorphous fluoropolymer.

5. The sensing system of claim 1 wherein the lens concentrator system comprises a single lens.

6. The sensing system of claim 5 wherein the single lens comprises amorphous fluoropolymer.

7. The sensing system of claim 1 wherein the lens concentrator system comprises at least two lenses.

8. The sensing system of claim 7 wherein the at least two lenses comprise amorphous fluoropolymer.

9. The sensing system of claim 1 further comprising the detector, the detector being configured to detect electromagnetic radiation in the first wavelength range.

10. A sensing system for a semi-active laser (SAL) guidance system, the sensing system comprising:
    an aperture lens configured to receive electromagnetic radiation reflected from a target;
    a lens concentrator system configured to receive the electromagnetic radiation from the aperture lens and guide the electromagnetic radiation to a detector, wherein the lens concentrator system comprises at least one lens formed of a fluorinated polymer having optical clarity for radiation having a wavelength between approximately 1.5 and approximately 2.0 µm.

11. The sensing system of claim 10 wherein the lens concentrator system comprises a single lens.

12. The sensing system of claim 10 wherein the lens concentrator system comprises at least two lenses.

13. The sensing system of claim 10 wherein the detector comprises a quad-cell detector.

14. The sensing system of claim 10 wherein the detector comprises dual band detector configured to detect radiation at two distinct wavelengths, where a first of the two distinct wavelengths is between approximately 1.5 and approximately 1.65 µm and a second of the two distinct wavelengths is between approximately 1.0 and approximately 1.1 µm.

15. A sensing system for a semi-active laser (SAL) guidance system, the sensing system comprising:
    an aperture lens configured to receive electromagnetic radiation reflected from a target;
    a detector configured to detect electromagnetic radiation in a wavelength range between approximately 1.5 and approximately 1.65 µm; and
    a lens concentrator system configured to receive the electromagnetic radiation from the aperture lens and guide the electromagnetic radiation to the detector, wherein the lens concentrator system comprises at least one lens formed of amorphous fluoropolymer having optical clarity for the electromagnetic radiation in the wavelength range between approximately 1.5 and approximately 1.65 µm.

16. The sensing system of claim 15 wherein the lens concentrator system comprises at least two lenses.

17. The sensing system of claim 15 wherein the detector comprises dual band detector configured to further detect electromagnetic radiation in a second wavelength range between approximately 1.0 and approximately 1.1 µm.

18. The sensing system of claim 15 further comprising a diffuser configured between the aperture lens and the lens concentrator system, and wherein the diffuser is formed from amorphous fluoropolymer having optical clarity for radiation having a wavelength between approximately 1.5 and approximately 1.65 µm.

* * * * *